UNITED STATES PATENT OFFICE 2,069,275

PHENOLIC COMPOUNDS

Henry S. Rothrock, Wilmington, Del., assignor to E. I. du Pont de Nemours & Company, Wilmington, Del., a corporation of Delaware No Drawing. Application February 6, 1935, Serial No. 5,300

13 Claims. (Cl. 260—154)

This invention relates to new chemical compounds, and more particularly to products obtained by condensing naphthanones with certain phenols.

This invention has as an object the preparation of condensation products of naphthanones and certain phenols having the para position unsubstituted. Another object is the preparation of 1,1-bis(4-hydroxyphenyl) decahydronaphthalene and 2,2-bis(4-hydroxyphenyl) decahydronaphthalene. Other objects will appear hereinafter.

By the term "naphthanones" I mean compounds of the formula—

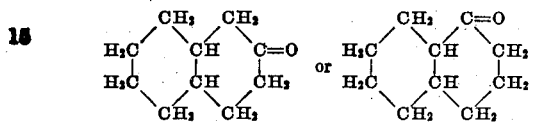

in which one or more of the hydrogens may or may not be replaced by substituent groups. These "naphthanones" are obtainable by subjecting a naphthol or substituted naphthol to complete ring hydrogenation and converting the resulting alcohol to the corresponding ketone by dehydrogenation or oxidation.

I preferably carry out my invention by reacting the phenol and naphthanone in the presence of a strong mineral acid and purifying the resulting condensation product by crystallization from an aromatic hydrocarbon solvent, high boiling gasoline, or acetic acid.

A suitable apparatus for carrying out the condensation between the phenol and the naphthanone consists of a vessel fitted with a thermometer, condenser, and a stirrer designed to sweep the sides and bottom of the reaction vessel. However, I do not wish to limit myself to this particular type of apparatus as it may be varied, depending upon the nature of the reactants and the method of carrying out the condensation.

The following examples are illustrative of the methods used in carrying out my invention:

Example I

Seventy parts by weight of beta-naphthanone and 86 parts by weight of phenol were mixed, saturated with dry hydrogen chloride, and allowed to stand at room temperature. After four days the solid mass in the flask was pulverized and washed successively with toluene and water. After one crystallization from 30 per cent acetic acid solution, a crystalline product having a melting point of 172–173° C. was obtained. Analysis of the crystals obtained showed them to contain 82.3 per cent carbon and 8.5 per cent hydrogen. The theoretical proportions of carbon and hydrogen in the formula for 2,2-bis(4-hydroxyphenyl) decahydronaphthalene ($C_{22}H_{26}O_2$) would be 82.0 per cent carbon and 8.1 per cent hydrogen. The acetyl number of the product obtained was 275.8; whereas the theoretical acetyl number of 2,2-bis (4-hydroxyphenyl) decahydronaphthalene is 275.9. Therefore, since the compound forms a diacetyl derivative, it is evident that the two oxygens occur in esterifiable hydroxyl groups. The reaction involved in the preparation of 2,2-bis(4-hydroxyphenyl) decahydronaphthalene is as follows:

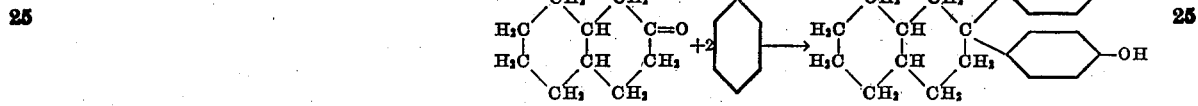

Alpha-naphthanone may be reacted with phenol, in a manner similar to that described in Example I, to form 1,1-bis(4-hydroxyphenyl) decahydronaphthalene.

The following example illustrates the use of concentrated hydrochloric acid as a catalyst in the preparation of 2,2-bis(4-hydroxyphenyl) decahydronaphthalene:

Example II

A mixture of 135 parts by weight of phenol, 76 parts by weight of beta-naphthanone, and 408 parts by weight of concentrated hydrochloric acid (sp. gr. 1.19) were heated for 24 hours at 30° C. in a flask fitted with a thermometer and stirrer. The paste-like semi-crystalline material obtained was purified by crystallization from toluene. The purified material had a melting point of 171–173° C., and was identified as 2,2-bis(4-hydroxyphenyl) decahydronaphthalene.

As in reactions of similar nature, the proportions of reactants, times and temperatures of reaction, as well as the kind and amount of catalyst, are factors which will vary to some extent with the nature of the reactants.

The reactants are preferably employed in substantially chemically equivalent proportions, i. e., one mol. of the ketone to two mols of the phenol. However, quantities outside this range are not precluded, and, sometimes, in the case of difficultly reacting phenols, the phenol may even be advantageously employed in excess. The ketone should occasionally be added in small successive quantities in order to minimize self-condensation.

The reaction may be conducted in the presence of inert solvents, e. g., toluene, benzene, solvent naphtha, petroleum naphtha, gasoline, chlorobenzene, glacial acetic acid, etc.

Temperatures should preferably range from 20° C. to 90° C. Below 20° C. little reaction takes place and above 90° C., undesirable side reactions are evidenced. The most generally suitable working range is from 30–60° C.

The time of reaction should vary with the temperature, lower temperatures requiring a longer period of time for completion of the reaction. Maximum yields are obtained after periods of time ranging from a few hours up to several days. The presence, nature, and quantity of the acid catalyst also should be considered. Gaseous hydrogen chloride, under the conditions of the examples, does not cause the reaction to proceed as rapidly as concentrated hydrochloric acid. The speed of reaction also varies somewhat with the reactants, particularly the phenol. The homologs of phenol generally require a longer period of reaction than does phenol itself.

The catalyst is preferably hydrochloric acid, although strong mineral acids generally, e. g., hydrobromic, sulfuric, phosphoric, etc., are operable to some extent. It is often advantageous to employ mixtures of the strong mineral acid with small amounts of boric acid or with lower aliphatic acids, such as acetic. Boric acid sometimes causes the production of lighter-colored products, and when used in conjunction with sulfuric acid, boric acid decreases the tendency to formation of sulfonated compounds.

The amount of the catalyst should often be large, in quantities even up to 3–5 mols per mol. of phenol. Sulfuric acid, for example, seems to be used best in quantities of 4.0–4.5 mols per mol. of phenol. The concentration of the catalyst should depend upon the nature of the acid. Anhydrous hydrogen chloride or concentrated hydrochloric acid both give excellent results whereas dilute hydrochloric is much less satisfastory. The concentration of sulfuric acid should be kept below 70–80 per cent as otherwise extensive sulfonation of the phenol takes place.

Substituted alpha and beta-naphthanones may also be employed in the practice of this invention. Thus, if the beta-naphthanone of Example I is replaced by an equivalent amount of 4-methyl-beta-naphthanone, the compound 2,2-bis(4-hydroxyphenyl)-4-methyldecahydronaphthalene is obtained. However, these substituted alpha and beta naphthanones, as well as alpha-naphthanone itself, are definitely less preferred reactants because they are generally more difficult to condense with phenols and the products are more difficult to purify.

Various substituted phenols may be used in place of the phenol in the examples provided the para position to phenolic hydroxyl is unsubstituted. By carrying out the reaction described in Example I with ortho or meta cresoles there are obtained the compounds 2,2-bis(4-hydroxy-3-methylphenyl) decahydronaphthalene and 2,2-bis (4-hydroxy-2-methylphenyl) decahydronaphthalene, respectively. Other monoalkyl substituted phenols that may be used in the practice of this invention include ortho- and meta-propyl phenols, ortho- and meta-amylphenols, etc.

The compounds of the present invention have the skeleton formula—

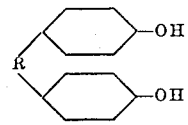

in which R is a substituted or unsubstituted decahydronaphthalene residue. The benzene rings may or may not carry alkyl substituents.

The products of the present invention may be halogenated as indicated by the following example:

*Example III*

Chlorine is continuously passed with stirring into a suspension of 322 grams of 2,2-bis(4-hydroxyphenyl) decahydronaphthalene in 1,000 grams of carbon tetrachloride until the mixture shows an increase in weight of 69 grams. The product is recovered by evaporation of the solvent and by analysis shown to contain two atoms of chlorine. This product is 2,2-bis(3-chloro-4-hydroxyphenyl) decahydronaphthanone.

The tetrachloro derivative 2,2-bis(3,5-dichloro-4-hydroxyphenyl) decahydronaphthalene is made by continuing the chlorination until the original mixture shows an increase in weght of 138 grams. The analogous bromine compound may be similarly prepared.

Valuable wetting and dispersing agents are made by sulfonation of the products of this invention, and by nitration products useful as dye intermediates are obtained.

The compounds disclosed herein are also especially useful as ingredients for making synthetic resins. Polyether resins, for instance, are made by reacting the mentioned compounds with aliphatic dihalides in accordance with the methods given in the application of J. A. Arvin, Serial No. 651,634, filed January 13, 1933. These resins are preferably made by heating above 100° C. in polymerizing proportions an aliphatic polyhalide (containing the halogens attached to carbon atoms which are in turn attached to other atoms by single bonds only) with the alkali or alkaline earth salt of my new polyhydric phenols. Thus, the resin made by reacting $\beta,\beta'$-dichlorodiethylether with 2,2-bis(4-hydroxyphenyl) decahydronaphthalene is superior to the resin similarly made from 1,1-bis-(4-hydroxyphenyl) cyclohexane in having a higher softening temperature. The resin from $\beta,\beta'$-dichlorodiethylether and 2,2-bis-(4-hydroxyphenyl) decahydronaphthalene softens at about 130° C., whereas the similarly prepared resin from 1,1-bis(4-hydroxyphenyl) cyclohexane softens at about 80°. This improvement in the softening point of polyether resins obtined through the use of my new polyphenols is of a wholly unexpected order of magnitude, and is of marked importance in resins of this type because it greatly enchances their field of utility.

The compounds of this invention are likewise useful for making resins with formaldehyde or with polybasic acid halides in accordance with the disclosure in the application of J. A. Arvin, Serial No. 723,795, filed May 3, 1934, and that of F. C. Wagner, Serial No. 664,032, filed April 1, 1933.

As many apparently widely different embodiments of this invention may be made without departing from the spirit and scope thereof, it is to be understood that I do not limit myself to the specific embodiments thereof except as defined in the appended claims.

I claim:

1. A condensation product of a naphthanone and a mononuclear monohydric phenol whose para position to the phenolic hydroxyl is unoccupied.

2. A compound of the formula—

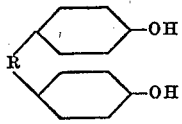

in which R is a decahydronaphthalene residue.

3. A phenol of the general formula set forth in claim 2 in which the benzene rings carry alkyl substituents.

4. A condensation product of a beta-naphthanone and a mononuclear monohydric phenol whose para position to the penolic hydroxyl is unoccupied.

5. 1,1-bis(4-hydroxyphenyl) decahyronaphthalene.

6. 2,2 - bis(4-hydroxyphenyl) decahydronaphthalene.

7. A process which comprises reacting a naphthanone and a mononuclear monohydric phenol whose para position to the phenolic hydroxyl is unoccupied.

8. A process which comprises reacting a beta-naphthanone and a mononuclear monohydric phenol whose para position to the phenolic hydroxyl is unoccupied.

9. A process which comprises reacting beta-naphthanone and phenol.

10. A process which comprises reacting, in the presence of an acid catalyst, a naphthanone and a mononuclear monohydric phenol having the para position to the phenolic hydroxyl unoccupied.

11. The process set forth in claim 10 in which the acid catalyst is hydrochloric acid.

12. A process which comprises reacting at 30° to 60° C. in the presence of hydrochloric acid a naphthanone and a mononuclear monohydric phenol whose para position to the phenolic hydroxyl is unoccupied.

13. A process which comprises reacting phenol and beta-naphthanone in the presence of hydrochloric acid at a temperature of 30° to 60° C.

HENRY S. ROTHROCK.